United States Patent
Allirot et al.

(10) Patent No.: US 10,811,832 B2
(45) Date of Patent: Oct. 20, 2020

(54) DOCKING STATION FOR AN ELECTRONIC PAYMENT TERMINAL, CORRESPONDING ELECTRONIC PAYMENT TERMINAL AND SYSTEM

(71) Applicant: INGENICO GROUP, Paris (FR)

(72) Inventors: Richard Allirot, Corenc (FR); Johann Balasse, Courbevoie (FR); Julien Roux, Caluire (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 16/531,852

(22) Filed: Aug. 5, 2019

(65) Prior Publication Data

US 2020/0044403 A1 Feb. 6, 2020

(30) Foreign Application Priority Data

Aug. 6, 2018 (FR) ...................................... 18 57331

(51) Int. Cl.
*G06F 1/16* (2006.01)
*H01R 33/97* (2006.01)
*H01R 13/631* (2006.01)

(52) U.S. Cl.
CPC ........... *H01R 33/97* (2013.01); *G06F 1/1632* (2013.01); *H01R 13/631* (2013.01)

(58) Field of Classification Search
CPC ..... G06Q 20/20; G07G 1/0036; G07G 1/0031
USPC ........................ 235/383, 375, 487; 705/5, 13
See application file for complete search history.

(56) References Cited

U.S. PATENT DOCUMENTS

| | | |
|---|---|---|
| 2004/0058705 A1 | 3/2004 | Morgan et al. |
| 2012/0033375 A1 | 2/2012 | Madonna et al. |
| 2016/0253668 A1 | 9/2016 | Lee |
| 2016/0274544 A1* | 9/2016 | Counas ................... G06F 1/163 |

(Continued)

FOREIGN PATENT DOCUMENTS

| | | |
|---|---|---|
| FR | 3027330 A1 | 4/2016 |
| WO | 03046710 A2 | 6/2003 |
| WO | 03046710 A3 | 6/2003 |

OTHER PUBLICATIONS

French Search Report dated Mar. 25, 2019 for corresponding French Application No. 1857331, filed Aug. 6, 2018.

(Continued)

*Primary Examiner* — Edwyn Labaze
(74) *Attorney, Agent, or Firm* — David D. Brush; Westman, Champlin & Koehler, P.A.

(57) ABSTRACT

A docking station for an electronic payment terminal includes a docking surface having a guide for guiding the terminal towards a connection position with the docking station. The docking station further includes a first locking element cooperating with a second complementary locking element of the terminal. The first locking element is mobile between: a deployed position in which the first locking element protrudes relative to the docking surface and cooperates with the second locking element, and a retracted position in which the first locking element does not cooperate with the second locking element. The guide includes a front wall extending from a front edge of the docking surface and facing a front face of the terminal. The front wall bears at least one positioning hook cooperating with a recess made on the front face of the terminal so as to prevent lifting of the terminal in the connection position.

10 Claims, 3 Drawing Sheets

(56) References Cited

U.S. PATENT DOCUMENTS

| | | |
|---|---|---|
| 2016/0275478 A1 | 9/2016 | Li et al. |
| 2017/0051538 A1 | 2/2017 | Kobayashi |
| 2017/0236109 A1 | 8/2017 | Pignal |

OTHER PUBLICATIONS

Written Opinion of the French Searching Authority dated Mar. 25, 2019 for corresponding French Application No. 1857331, filed Aug. 6, 2018.

Machine translation and European Action dated Dec. 18, 2019 for corresponding European Application No. 19189817.0.

\* cited by examiner

DOCKING STATION FOR AN ELECTRONIC PAYMENT TERMINAL, CORRESPONDING ELECTRONIC PAYMENT TERMINAL AND SYSTEM

1. FIELD OF THE INVENTION

The invention relates to the field of payments systems and more specifically to the field of payment terminals.

More particularly, the invention relates to a docking station for an electronic payment terminal, to an electronic payment terminal and to an associated electronic payment system.

2. PRIOR ART

At present, electronic payment terminals are predominantly used when paying for purchases of goods and services at sales points.

Such terminals generally comprise a smart-card reader and a magnetic-card reader. They also comprise a screen, used especially to view amounts of transactions, and a keypad to enter these amounts as well as customers' confidential codes, or else they have a touchscreen.

These payment terminals generally possess a battery that enables them to work independently. This battery has to be regularly recharged, classically by means of a docking station, also called a dock, a powering dock or a powering base on which the mobile payment terminal is placed in a horizontal or near horizontal position, so that the contacts of the terminal come into contact with the contacts of the station forming an electrical connection between the power supply means of the terminal and the power supply means of the station.

The station can be connected to a computer by a wire link, for example according to the USB (Universal Serial Bus) standard.

Classically, such a docking station has means for guiding the payment terminal to a powering position. These means are, for example, in the form of upright elements along which the terminal must slide However, at present, the payment terminal is not held on to the docking station in a totally satisfactory manner. If it is badly held, then that would imply a poor potential contact that may cause a transaction to fail.

For example, a poor contact on the linking connector, for example a poor USB contact, can cause a transaction to fail when the table carrying the docking station and the terminal undergoes vibrations or a shift as there may be intermittent losses of contact. Such a drawback can be a problem during network communications for example.

In addition, when a large number of contacts is made between the docking station and the terminal, whether these are charging contacts or USB type contacts, the stress resulting from the compression of the contacts can be greater than the weight of the terminal and can therefore prevent high-quality contact.

Besides, if the payment terminal is poorly held to the docking station, this can hamper the accurate reading of a smart card because the force of insertion of the card into the terminal can cause it to exit its housing in the station or it can causes a magnetic reader card to come out because of a slippage of the card by jerking movements in the dedicated slot of the terminal, or it can cause the card to escape when it is being swiped in said slot for example.

Finally, another drawback of present-day payment systems is that they prove to be bulky and therefore cumbersome for users.

Thus, there is a need to propose a payment system comprising a docking station as well as an associated electronic payment terminal that can be used to at least partly resolve some of the drawbacks of the prior art.

3. SUMMARY

An aspect of the disclosure relates to a docking station for an electronic payment terminal comprising a docking or receiving surface for said payment terminal, said docking surface being provided with a guide for guiding said terminal towards a position of connection of the terminal with said docking station.

According to an exemplary embodiment, the docking station is characterized in that it furthermore comprises a first locking element capable of cooperating with a second complementary locking element of said payment terminal, said first locking element being mobile between:

a deployed position in which the first locking element protrudes out of said docking surface and cooperate with the second locking element so that the payment terminal is locked onto said docking station, and a collapsed or retracted position in which the first locking element does not cooperate with the second locking element so that the payment terminal is not locked onto said docking station and can be removed from said docking station, said guide comprising a front wall extending from the front edge of said docking surface and facing which the front face of said payment terminal is to get positioned, said front wall bearing at least one positioning hook capable of cooperating with a recess made on the front face of said payment terminal so as to prevent the lifting of said terminal in the connection position.

Thus, an exemplary embodiment proposes a novel and inventive approach to at least partly resolve some of the drawbacks of the prior art.

To this end, an exemplary embodiment provides for a reversible locking of the payment terminal to the station by the implementing of a mobile locking element on the station that cooperates or does not cooperate with fixed complementary locking element situated beneath the payment terminal.

These locking elements serve to hook the terminal to the supporting element so as to position it accurately and to make it fixed in order to maintain a satisfactory electrical contact between the station and the terminal and provide for optimal working of the unit.

The mobile locking element can be retracted to detach the terminal from the station and enable the terminal to be used moveably.

According to one particular embodiment, the first mobile locking element comprises two fingers and the second locking element comprises two housings into which the two fingers get at least partly housed when these fingers are in the deployed position.

According to one aspect of at least one embodiment, the station furthermore comprises an actuator for actuating said first locking element capable of making the first mobile locking element pass from the deployed position to the retracted position.

According to another particular characteristic of at least one embodiment, the actuator comprises an unlocking push-button extending on a surface opposite to the docking surface, the unlocking pushbutton being mounted pivotingly on said docking station and carrying a return spring fixedly attached to said docking station.

The first locking element is capable of being shifted from the deployed position to the retracted position by manual pressure on the pushbutton.

A manual pressure on the pushbutton against the spring causes the pivoting of the pushbutton and the retraction of the first locking element, and this enables the release of the terminal which can be detached from the base.

According to one characteristic of at least one embodiment, the unlocking pushbutton comprises an aperture intended to cooperate with a Kensington-type bolt connected to a cable lock.

According to an additional characteristic, the front wall extends appreciably perpendicularly to the docking surface.

According to another particular characteristic of at least one embodiment, said guide comprises at least one lateral wall extending from a lateral edge of said docking surface and prolonging the front wall.

According to another aspect of at least one embodiment, at least one tab extends from the rear edge of said docking surface, said at least one tab being intended for cooperating with a housing made beneath the payment terminal so as to prevent the lifting of said terminal in the connection position.

An aspect of the disclosure also relates to an electronic payment terminal that can be positioned on a docking station according to one of the above-mentioned embodiments, the terminals comprising second locking element capable of cooperating with first complementary locking element made on a docking surface of the docking station.

According to another aspect of at least one embodiment of the terminal, it has a front face comprising at least one recess configured to cooperate with a hook for positioning the docking station and at least one housing made beneath the terminal is configured to cooperate with a tongue of said docking station.

An aspect of the disclosure also relates to an electronic payment system comprising an electronic payment terminal according to one of the above-mentioned embodiments, capable of being positioned on a docking station according to one of the embodiments described in detail here above, the terminal being mobile relative to the station between:
- a connection position in which the first mobile locking element cooperates with the second mobile locking element so that the payment terminal is locked to the station, and
- a detached position in which the first locking element is not fixedly attached to the second locking element so that the payment terminal is not locked to the station.

4. LIST OF FIGURES

The disclosure as well as the different advantages that it presents will be understood more clearly from the following description of an illustratory and non-exhaustive embodiment, and from the appended drawings, of which:

5. DETAILED DESCRIPTION OF ONE EMBODIMENT OF THE DISCLOSURE

Figure 1:
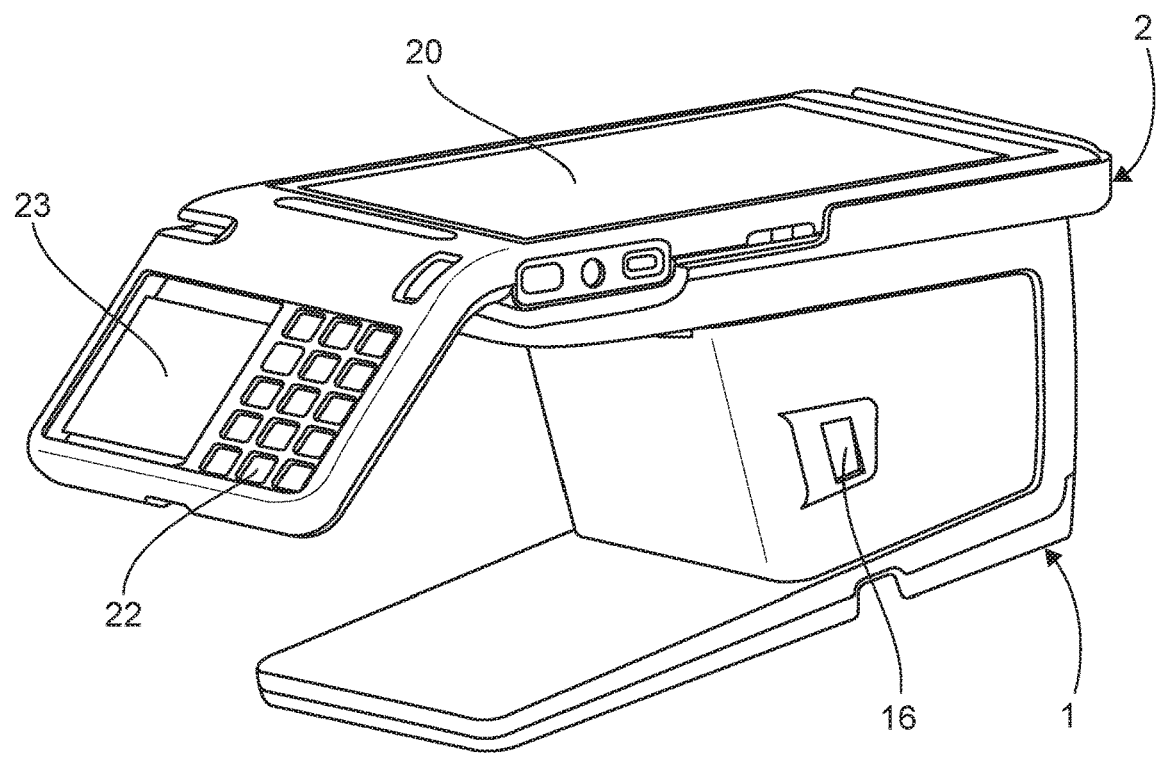
FIG. 1 is a three-quarter view or view in perspective of a side of a payment system according to one embodiment of the disclosure showing the payment terminal when it is mounted on the dock.

In the present description, the orientation and positioning terms "front", "rear", "side" or "lateral" refer arbitrarily to a normal position of use of a payment terminal and a docking station. In addition, the terms "longitudinal" and "transversal" are used in referring to directions that are respectively approximately orthogonal to the front and rear faces of the docking station and approximately orthogonal to the lateral faces of the docking station.

Referring now to FIGS. 1 to 7, we present an electronic payment system comprising a docking station and an associated payment terminal.

As illustrated especially in FIGS. 1, 2, 3 and 4, the electronic payment terminal 2 which can be positioned on a docking station or dock 1 comprises a magnetic-card reader 25A, a smartcard reader 25B, at least one transaction-viewing screen 20, 23, a USB port 16 and an entry keypad 22.

In this embodiment, the electronic payment terminal 2 comprises two screens, namely a first screen 20 enabling for example a merchant to view a state of connection of the terminal 2 on the docking station 1 and a state of progress of a transaction, and a second screen 23 enabling a client to view, for example, the amount of a transaction as well as the action of entering a confidential code proper to his credit card in order to carry out a transaction.

It must be noted that, according to one embodiment of the disclosure, these two screens 20, 23 can be touchscreens.

This electronic payment terminal 2 can be positioned on the docking station 1 and is mobile relative to the station 1 between:
- a connection position in which the payment terminal 2 is locked on to the station 1, and
- a detached position in which the payment terminal 2 is not locked on to the station 1.

To enable the positioning of such an electronic payment terminal 2, the docking station 1 comprises a docking surface 10 for the electronic payment terminal 2.

Such a docking surface 10 is, in this example, substantially plane. This docking surface 10 comprises a connector 14 used to set up an electrical connection with the electronic payment terminal 2.

Figure 5:
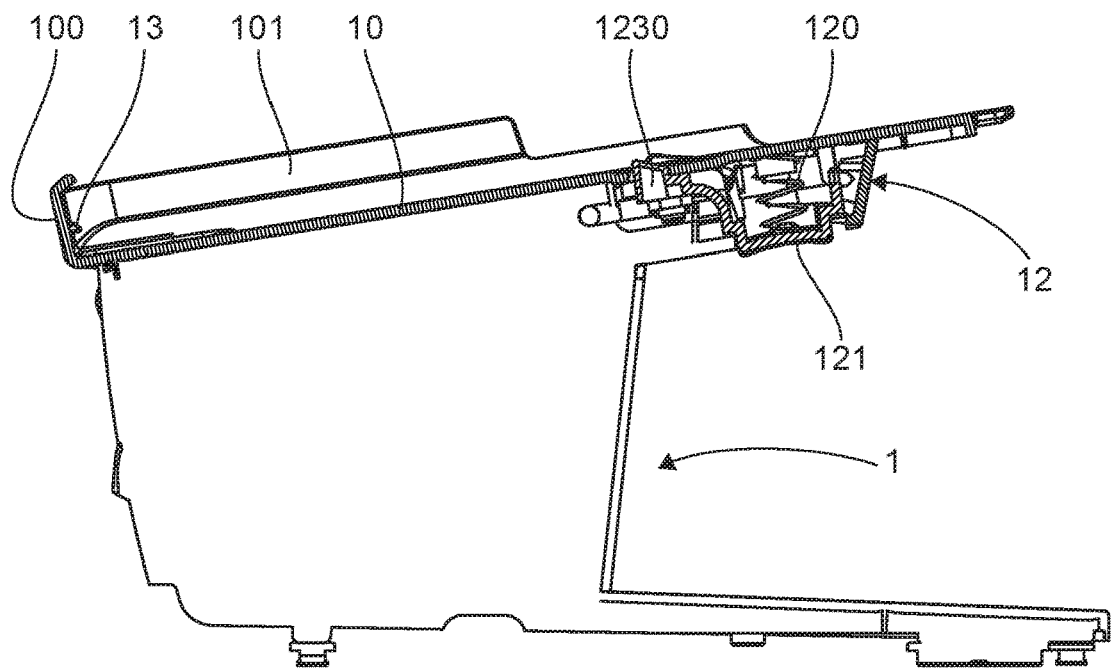
FIG. 5 is a view in longitudinal section of the docking station of the system illustrated in FIGS. 1 and 2.
Figure 7:
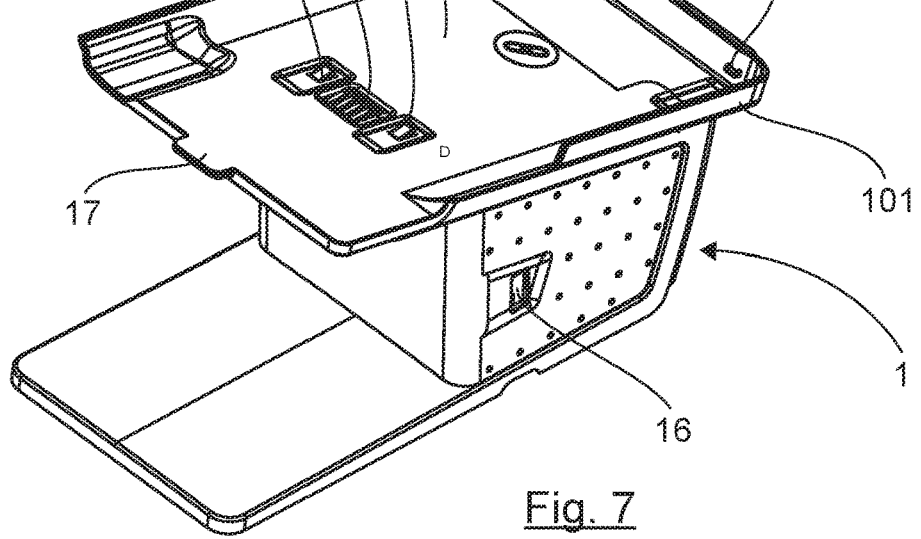
FIG. 7 is a three-quarter view or view in perspective seen from the top of the docking station of the system illustrated in FIGS. 1 and 2.

The docking surface 10, as illustrated especially in FIGS. 5 and 7, is provided with a guide for guiding the terminal 2 towards a position of connection of the terminal 2 to the docking station 1. In this connection position, the electronic payment terminal 2 is placed in such a way that the connector 14 made on the docking surface 10 is connected with communications circuit 26 (illustrated in FIG. 4) carried by the lower surface of the terminal 2 opposite the surface bearing the screens 20, 23.

In this embodiment, this connector 14 of the docking station 1 combines electrical charging pins with data transfer pins The docking station 1 also comprises a guide 15 that includes, in this embodiment, a front wall 100 extending from the front edge or forward edge of the docking station 10 and having a rectilinear outline, curved back at its free end and complementary to the outline of the front face 200 of the terminal 2. The front face 200 of the terminal 2 is intended to get positioned against the front wall 100.

In other words, the guide 15 of the docking surface 10 have a front shoulder, herein called a front wall 100, that extends from the forward edge or front edge of the docking station 10 perpendicularly to the docking surface 10. Such a front wall 100 forms a positioning stop for the electronic payment terminal 2 and prevents a forward sliding of this terminal 2 or a wrong positioning of this terminal 2 before the docking station 1, which would result in a poor electrical connection between the terminal 2 and docking station 1.

Naturally, it is possible to implement a docking station and an electronic payment terminal where the front portion and the front face respectively have an outline other than the one illustrated.

So as to ensure guidance and positioning that enable a satisfactory electrical connection, the front wall 100 of the docking station 1 is provided with at least one positioning hook, or tab, capable of cooperating with a recess 24 made on the front face 200 of the terminal 2.

These hooks 13 and recesses 24 furthermore prevent a lifting of the terminal 2 when it is positioned on the docking station 1.

Opposite the front wall 100, a lift-preventing tab 17 extends from the rear edge of the docking surface 10 in the plane of this docking surface. This tab 17 is intended to cooperate with a housing 27 made beneath the terminal 2.

In the embodiment presented, the front wall 100 is provided with two hooks 13 spaced out from one another and each cooperating with a recess 24, the two recesses being made in the front face 200 of the terminal 2.

These two hooks 13 herein take the form of rectangular strips that get positioned in the recesses 24 having complementary shapes.

It is possible however to plan for hooks having other shapes.

The guide 15 of the docking surface 10 illustrated in this embodiment furthermore comprise a lateral wall 101 connected to the front wall 100 and extending perpendicularly to the docking surface 10. The implementation of this lateral wall 101 prevents the electronic payment terminal 2 from shifting sideways relative to the docking surface 10 and therefore relative to the docking station 1.

It can be noted that a lateral wall opposite the lateral wall 101 could be planned.

The terminal 2 is positioned on the docking station 1 in being made to slide forwards from the rear on the docking surface 10. The hooks 13 and the tab prevent the lifting of the terminal 2, and fingers 1230 described in detail here below provide for a non-return locking of the terminal 2 to the docking station 1.

As illustrated in the different figures, and so as to provide an electronic payment system in which the docking station satisfactorily holds the payment terminal to itself, the docking station 1 furthermore comprises a first locking element 1230, capable of cooperating with a second complementary locking element 21 carried by the payment terminal 2, the first locking element 1230 being mobile between:

a deployed position in which the first locking element 1230 protrude relative to the docking surface 10 and are fixedly attached to or cooperate with second locking element 21 so that the payment terminal 2 is locked to the docking station 1;

a retracted position in which the first locking element 1230 is moved away from the second locking element 21 so that the payment terminal 2 is not locked to the docking station 1.

In this way, the payment system is such that the terminal 2 is mobile relative to the docking station 1 between:

a connection position in which the first locking element 1230 is fixedly attached to the second locking element 21 so that the payment terminal 2 is locked to said docking station 1;

a free position in which the first locking element 1230 is not fixedly attached to the second locking element 21 so that the payment terminal 2 is not locked to the docking station 1.

Figure 2:
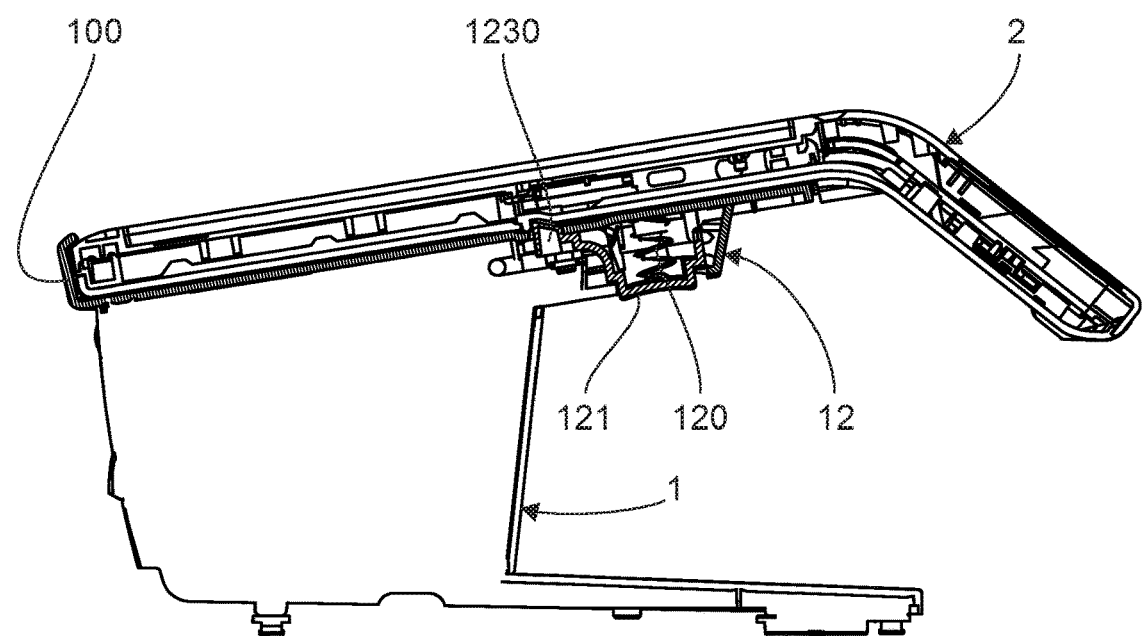
FIG. 2 is a view in longitudinal section of the payment system of FIG. 1.
Figure 3:
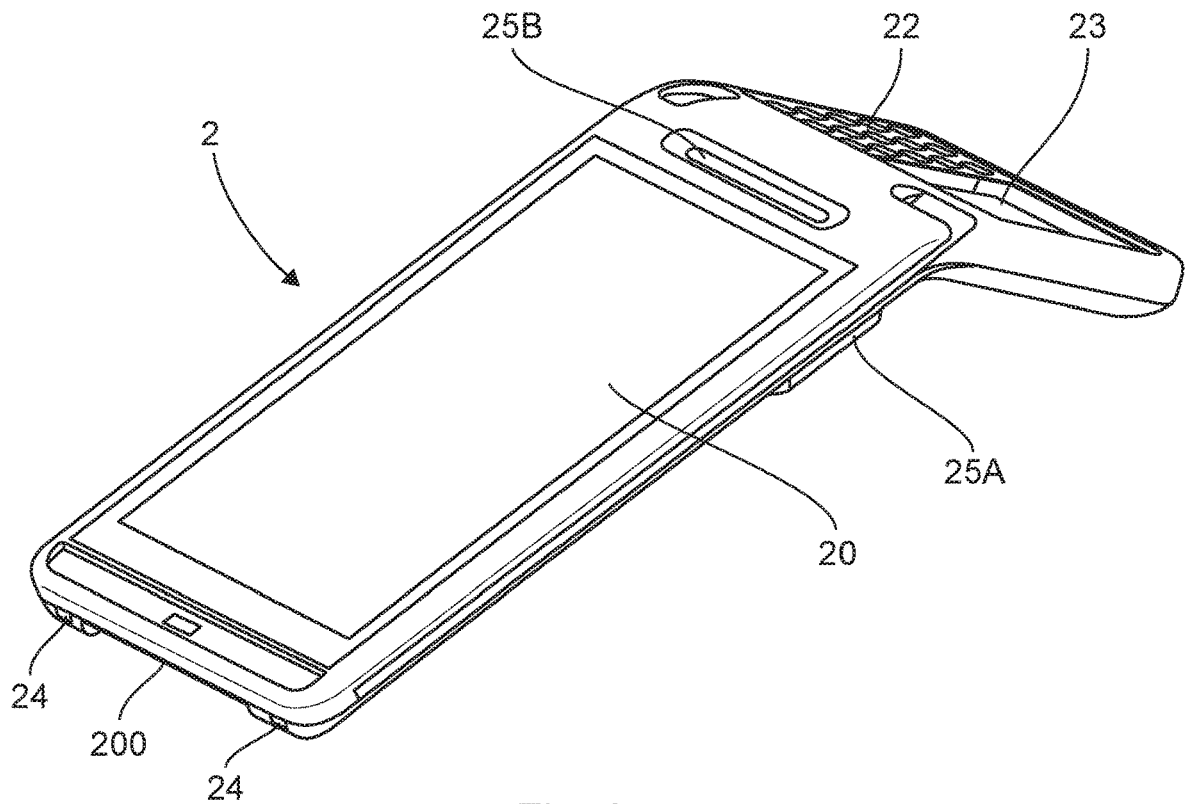
FIGS. 3 and 4 are three-quarter views or views in perspective seen from the top and the bottom respectively of the payment terminal of the system illustrated in FIGS. 1 and 2.
Figure 4:
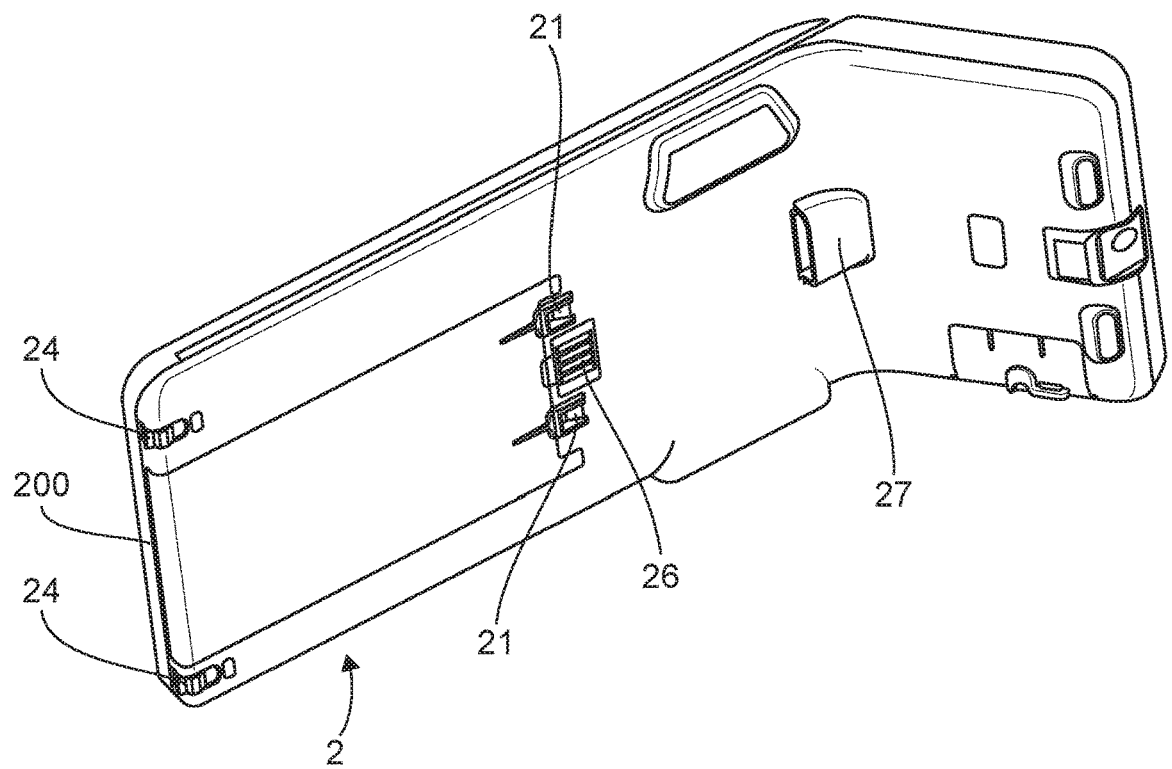

As can be seen more particularly in FIGS. 2 and 5, and so as to make the first locking element 1230 move from the retracted position to the deployed position, the docking station 1 comprises an actuator for actuating the first locking element 1230.

The actuator comprises an unlocking pushbutton 12 extending on the surface of the docking station 1 opposite said docking surface 10.

Figure 6:
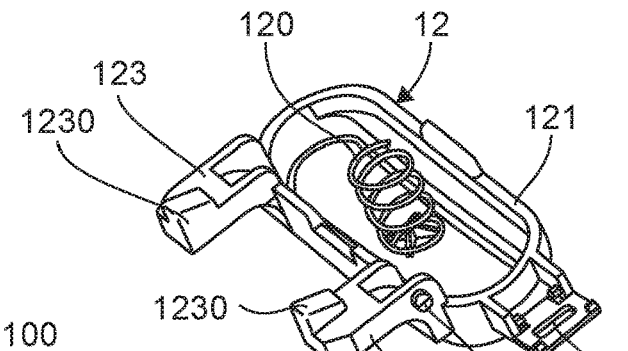
FIG. 6 is a three-quarter view or view in perspective of the unlocking button carried by the docking station of the system illustrated in FIGS. 1 and 9.

As illustrated especially in FIGS. 5 and 6, this pushbutton 12 comprises an oblong-shaped hollow cap or cover 121 to which a return spring 120 is affixed.

The cover 121 has two "L"-shaped legs 123. Each leg 123 has a pin 1231 on a lateral edge and a locking finger 1230, the upper face of which is tilted.

The cover 121 is mounted so as to be pivotingly mobile by means of the pins 1231 on the docking station 1.

Since the terminal 2 is locked to the docking station 1, when a user, preferably using his index finger, presses the pushbutton 12 and exerts upward pressure, the pushbutton 12 pivots about the pins 1232, leading the two locking fingers 1230 to pass from their deployed position, where they protrude from the docking surface 10, to their retracted position where they are housed in the docking station 1 without projecting relative to the docking surface 10.

Thus, it is the user's action on the pushbutton 12 that enables the electronic payment terminal 2 to be released from its locked position on the docking station 10. Once the user stops pressing the pushbutton 12, this pushbutton returns to the idle position or resting position under the action or effect of the pullback spring 120.

In the deployed position, the first locking element of the docking station 10, which therefore comprise two locking fingers 1230, cooperate with the second locking element 21 of the payment terminal 2.

In the embodiment illustrated, the second locking element 21 includes two "U"-shaped housings that get placed so as to be facing the two fingers 1230 when the terminal 2 is positioned on the docking station 10.

When a user places the electronic payment terminal 2 on the docking station 10, the locking fingers 1230 get placed in the housings 21 of the electronic payment terminal which is then blocked in translation relative to the docking station 10 from the front towards the rear and sideways or laterally.

When a user places the terminal 2 on the docking station 1, a locking "click" signals the fact that this terminal 2 is accurately positioned on the docking station 1.

To remove the terminal 2 from the docking station 1, the user exerts pressure on the pushbutton 12 thus causing the fingers 1230 to retract downwards outside the housings 21.

It is possible to imagine other embodiments in which the first locking element has more than two fingers so that, for example, they block other potential movements of the electronic payment terminal relative to the docking station.

It is also possible to imagine an embodiment in which the fingers are disposed in the longitudinal direction of the docking station, the housings of the terminal being disposed accordingly.

It must be noted that these locking fingers 1230 have the function of preventing the backward motion of the payment terminal 2 on the docking station 1.

The cover 121 of the pushbutton 12 has a through aperture 122, on a lateral edge, having a substantially oblong edge.

Such an aperture 122 is meant to cooperate with a Kensington type lock connected to a cable lock so as to secure the installation of the docking station 1.

An exemplary embodiment of the present disclosure at least partly mitigates the drawbacks of the prior art.

More specifically, An exemplary embodiment of the present disclosure seeks to mitigate at least some of the drawbacks of prior-art payment systems.

An exemplary embodiment of the present disclosure provides a docking station for an electronic payment terminal that can be used to provide for sufficient maintenance to maintain a satisfactory electrical contact between the station and the terminal resting on this station.

An exemplary embodiment of the present disclosure implements such a payment system having limited space requirement.

An exemplary embodiment of the present disclosure provides a system of this kind that is simple to use and costs little to implement.

Although the present disclosure has been described with reference to one or more examples, workers skilled in the art will recognize that changes may be made in form and detail without departing from the scope of the disclosure and/or the appended claims.

The invention claimed is:

1. A docking station for an electronic payment terminal comprising:
   a docking surface for said payment terminal, said docking surface being provided with a guide for guiding said terminal towards a connection position of said terminal with said docking station,
   a first locking element capable of cooperating with a second complementary locking element of said payment terminal, said first locking element being mobile between:
     a deployed position in which the first locking element protrudes relative to said docking surface and cooperates with the second locking element so that the payment terminal is locked onto said docking station, and
     a retracted position in which the first locking element does not cooperate with the second locking element so that the payment terminal is not locked onto said docking station (1) and can be removed from said docking station,
   wherein the guide comprises a front wall extending from a front edge of said docking surface and faces a front face of said payment terminal when in the connection position, said front wall bearing at least one positioning hook capable of cooperating with a recess made on the front face of said payment terminal so as to prevent the lifting of said terminal in the connection position.

2. The docking station according to claim 1, wherein the first mobile locking element comprises two fingers and the second locking element comprises two housings into which said two fingers get at least partly housed when these fingers are in the deployed position.

3. The docking station according to claim 1, further comprising an actuator for actuating said first locking element and making the first mobile locking element pass from said deployed position to said retracted position.

4. The docking station according to claim 3, wherein the actuator comprises an unlocking pushbutton extending on a surface opposite to said docking surface, the unlocking pushbutton being mounted pivotingly on said docking station and carrying a return spring fixedly attached to said docking station.

5. The docking station according to claim 4, wherein the unlocking pushbutton comprises an aperture configured to cooperate with a Kensington-type bolt connected to a cable lock.

6. The docking station according to claim 1, wherein said guide comprises at least one lateral wall extending from a lateral edge of said docking surface and extending from the front wall.

7. The docking station according to claim 1, wherein at least one tab extends from a rear edge of said docking surface, said at least one tab configured to cooperate with a housing made beneath the payment terminal so as to prevent lifting of said terminal in the connection position.

8. An electronic payment terminal that can be positioned on the docking station according to claim 1, wherein the electronic payment terminal comprises the second locking element cooperating with the first complementary locking element made on the docking surface of said docking station.

9. The electronic terminal according to claim 8, wherein the front face comprises at least one recess configured to cooperate with the at least one hook for positioning said docking station and in that wherein at least one housing is made beneath the terminal and is configured to cooperate with a tab of said docking station.

10. An electronic payment system comprising:
   a docking station for an electronic payment terminal, comprising:
     a docking surface for said payment terminal, said docking surface being provided with a guide for guiding said terminal towards a connection position of said terminal with said docking station,
     a first locking element capable of cooperating with a second complementary locking element of said payment terminal, said first locking element being mobile between:
       a deployed position in which the first locking element protrudes relative to said docking surface and cooperates with the second locking element so that the payment terminal is locked onto said docking station, and
       a retracted position in which the first locking element does not cooperate with the second locking element so that the payment terminal is not locked onto said docking station and can be removed from said docking station,
     wherein the guide comprises a front wall extending from a front edge of said docking surface and faces a front face of said payment terminal when in the connection position, said front wall bearing at least one positioning hook capable of cooperating with a recess made on the front face of said payment terminal so as to prevent lifting of said terminal in the connection position; and
   the electronic payment terminal the terminal being mobile relative to the docking station between:
     the connection position in which the first locking element cooperates with the second locking element so that the payment terminal is locked to said station, and a detached position in which the first locking element is not fixedly attached to the second locking element.

\* \* \* \* \*

UNITED STATES PATENT AND TRADEMARK OFFICE
CERTIFICATE OF CORRECTION

Page 1 of 1

PATENT NO. : 10,811,832 B2
APPLICATION NO. : 16/531852
DATED : October 20, 2020
INVENTOR(S) : Richard Allirot et al.

It is certified that error appears in the above-identified patent and that said Letters Patent is hereby corrected as shown below:

In the Claims

In Claim 1, Column 7, Line 52, please delete "(1)" after the word "station" and before the word "and"

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*